United States Patent [19]

Tardy

[11] Patent Number: 4,854,221

[45] Date of Patent: Aug. 8, 1989

[54] PILOT-CONTROLLED VALVE FOR BRAKING OR SPEED LIMITATION IN A HYDRAULIC CIRCUIT

[75] Inventor: Maurice Tardy, Loire, France

[73] Assignee: Bennes Marrel, France

[21] Appl. No.: 517,726

[22] Filed: Jul. 27, 1983

[30] Foreign Application Priority Data

Jul. 27, 1982 [FR] France ................................ 82 13436

[51] Int. Cl.[4] ...................... F15B 13/042; F16K 20/00

[52] U.S. Cl. .......................................... 91/420; 91/461

[58] Field of Search .................................. 91/420, 461

[56] References Cited

U.S. PATENT DOCUMENTS 4,244,275 1/1981 Smilges ................................ 417/420
4,342,256 8/1982 Andersen et al. ...................... 91/420
4,364,304 12/1982 Anderson et al. ..................... 91/420
4,470,339 9/1984 Tardy ..................................... 91/420
4,531,449 7/1985 Reith ..................................... 91/420

FOREIGN PATENT DOCUMENTS 0051728 5/1982 Fed. Rep. of Germany ........ 91/420

*Primary Examiner*—Leonard E. Smith
*Attorney, Agent, or Firm*—Remy J. VanOphem

[57] ABSTRACT

A valve for retaining a jack which retains a drive load. The braking valve includes a pressure reducing valve and safety valve, one of which ensures that the pressure in the chamber is retained, while the other modulates the pilot-control pressure $P_p$. Thus, at each moment, the pilot-control pressure $P_p$ is adjusted to the value of the retaining pressure $P_l$.

14 Claims, 6 Drawing Sheets

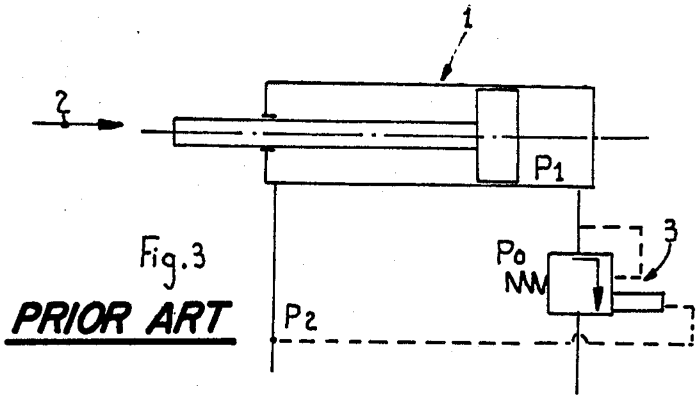
Fig.3
PRIOR ART
Fig.5
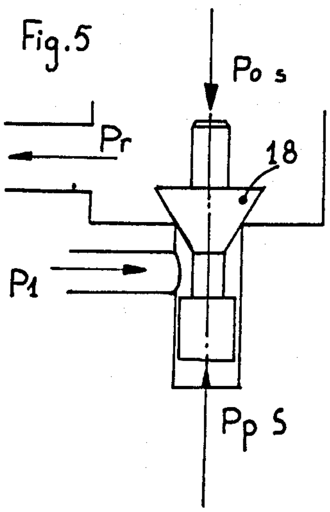
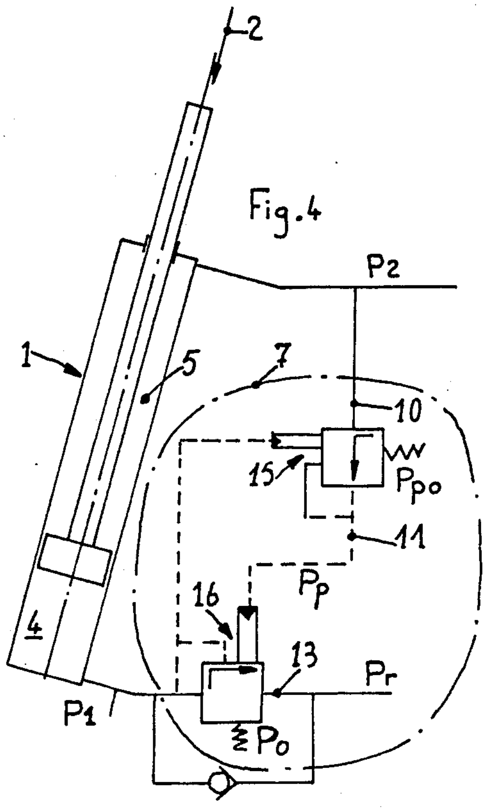
Fig.4

7
30
13
R
$P_2$
10
$P_R$
11
6
8
$s_1$
15
14
$s_1$
$P_1$
33
17
S
32
31
36
5
16
35
18
34
$P_1$

PILOT-CONTROLLED VALVE FOR BRAKING OR SPEED LIMITATION IN A HYDRAULIC CIRCUIT

BACKGROUND OF THE INVENTION

1. FIELD OF THE INVENTION

The present invention relates to pilot-controlled valves intended for use with hydraulic circuits, specifically valves of the type generally used in a braking valve, balancing valve, speed limiter or safety valve.

These valves are designed so as to prevent an abrupt and dangerous drop of the load raised, even in the event of rupture of a pipeline.

In general terms, such a valve is used to maintain a sufficient pressure in a hydraulic motor or in a hydraulic jack to allow the controlled displacement of a torque or of a drive load. As a non-limiting example, it will be noted that such a braking valve can be used on a vehicle with an open-circuit hydrostatic transmission when it descends a slope or when it carries out a braking operation, as well as on a hydraulic crane when it deposits a load on the ground.

2. DESCRIPTION OF THE PRIOR ART

The use of a braking valve of this type for controlling the hydraulic members supporting heavy loads is well known. For example, U.S. Pat. No. 4,470,339, incorporated herein by reference, shows such valve inserted in a high-pressure circuit to vary the shut-off cross-section and is controlled by means of a pilot-control pressure. However, this pilot-control pressure can be made to vary during operation in a way which is not always under control and can result in the occurrence of jerky movements in the receiving devices.

If, for example, such a valve is mounted on the control of two chambers of a hydraulic crane jack, the recording of the pressures at the start of the movement shows that the pressure decreases in the chamber of the jack which retains the load and increases in the opposite chamber. These pressure variations correspond to the phase of acceleration of the movable mass connected to the jack. When the desired speed is reached, the pressure increases in the loaded section of the jack and diminishes in the opposite section, as shown in the prior art FIG. 1. In this figure, the curve points $P_1$, $P'_1$, and $P''_1$ represent the pressure changes in that chamber of the jack which retains the load. In contrast to this, the points $P_2$, $P'_2$, and $P''_2$ represent the pressure changes in the opposite chamber of the jack. The time t is plotted on the abscissa.

This physical phenomenon gives rise to problems in the adjustment of the braking valve which, because of its design, is sensitive to pressure variations in the loaded section and the opposite section.

Another physical phenomenon linked to the operation of the jack disturbs the pressure conditions in the chambers of the jack. This phenomenon is friction. Taking as an example a jack, the efficiency of which is 0.95, retaining a mass which determines a pressure of 300 bars in the loaded section, the action of friction is equivalent to a pressure of 300. (1–0.95)=15 bars. The pressure variation in the loaded section can be ±15 bars depending on the direction of the average speed.

In actual fact, the average speed is adjusted as a result of the flow in the opposite section. Consequently, the influence of the variations attributed to friction is manifested in pressure variations occurring, for example, in the small section. If the ratio of the sections of the jack is 1.8, the amount of pressure variations in the small section will be: $\pm 15\times 1.8=\pm 27$ bars.

Finally, if the braking valve described in U.S. Pat. No. 4,470,339 is considered, the ratio between the section S, sensitive to the pilot-control pressure and the section $\underline{s}$, sensitive to the pressure to be braked, is:

$$S/\underline{s}=15$$

Under these conditions, it will be seen that a variation of 27 bars in the pilot-control pressure is equivalent to a variation of $27\times 15=405$ bars in the pressure to be braked.

The results of these two phenomena being superimposed on one another are illustrated in FIG. 2 and schematically shown in FIG. 3. Assuming a loaded jack 1, of which the movement according to the drive load (the direction of contraction indicated by the arrow 2) is controlled by a safety valve 3 calibrated to a pressure $P_o$ and the pilot-control ratio of which is N, the opening condition of the valve is:

$$P_o=P_1+P_2\cdot N$$

where:

$P_o$ is the calibration threshold of the valve 3;

$P_1$ is the pressure at the large section in the jack 1; and $P_2$ is the pressure at the small section, used to pilot-control the safety valve 3.

Without the phase of setting the jack 1 in motion, $P_1$ drops in order to obtain an acceleration of the mass attached to the jack; let $P_m$ be the value of the pressure corresponding to the acceleration force. A corresponding pressure $P_f$ can be defined for the frictional force. During the phase of setting in motion, a pressure:

$$P'_1=P_1-(P_m+P_f)$$

will prevail in the loaded section of the jack.

To ensure that the safety valve is opened, it is necessary for $P_2$ to increase by the value:

$$(P_m+P_f)\times\frac{1}{N}$$

When the speed is reached, the acceleration pressure is zero. The pressure in the jack then assumes the value $P''_1$, so that $P''_1=P_1-P_f$. Likewise, $P_2$ becomes $P''_2$.

Thus, the pressure spectrum as a function of time is illustrated in FIG. 1, and the variations in the balanced state, when the safety valve is pilot-controlled by the pressure $P_2$ in the opposite section, are shown in FIG. 2. However, this solution is of interest because it makes it possible to detect the runaway of the load (in the event of overspeed the pressure in the opposite section is cancelled). It also avoids the need to retransmit electrical or hydraulic commands to the safety valve and, therefore, to the jack. This latter point is especially useful for machines equipped with manual or muscular-control distributors and having as their only command system displacements of mechanical components, such as levers and connecting rods, between the operator and the group of distributors.

SUMMARY OF THE INVENTION

The object of the present invention is to avoid these disadvantages by producing a braking valve, the pilot-control pressure of which can vary as a result of the presence in its pilot-control circuit of a pressure reducing valve, the reduced pressure of which is a function of the calibration of the spring and of the pressure in the loaded section of the jack.

The attached drawing given by way of non-limiting example will make it possible to better understand the characteristics of the invention.

BRIEF DESCRIPTION OF THE DRAWINGS

FIG. 3 is a schematic view of a prior art hydraulic system;

FIG. 4 is a schematic hydraulic diagram illustrating the operation of a braking valve provided according to the invention;

FIG. 5 shows a schematic hydraulic diagram of an alternative application of the invention;

DETAILED DESCRIPTION OF THE PREFERRED EMBODIMENT

FIG. 4 schematically illustrates a hydraulic jack 1 which works with a retaining action counter to a load which tends to make it retract, as indicated by FIG. 3. The large section of the jack corresponds to a retaining chamber 4 in which the pressure $P_1$ prevails. The small section corresponds to the opposite chamber 5 in which the pressure $P_2$ prevails.

OPERATION

Figure 1:
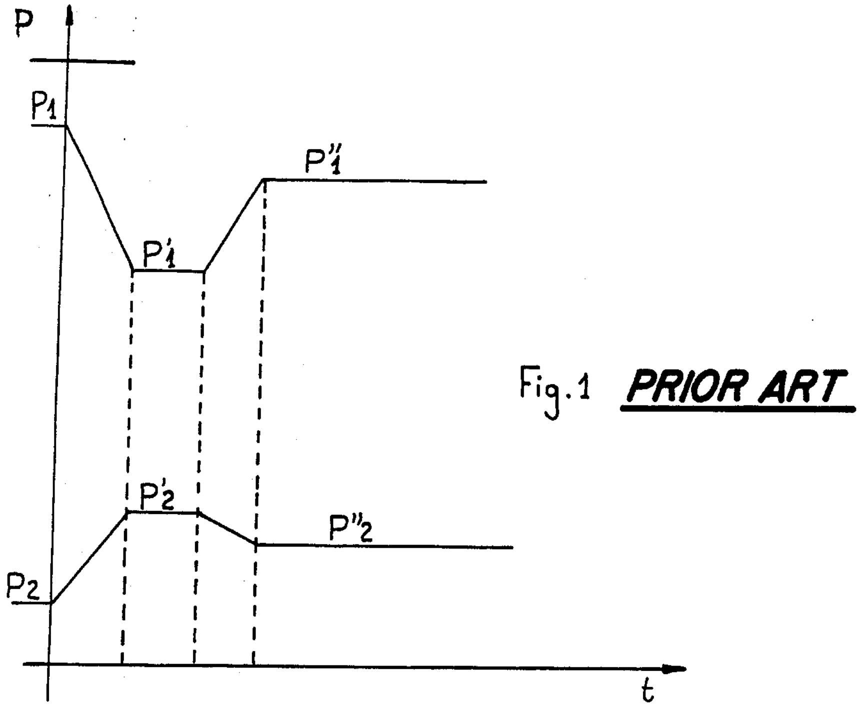
Fig. 1 PRIOR ART
FIG. 1 is a graph showing the relationship between pressure and time in the opposite chambers of a prior art hydraulic device if friction is not taken into account.
Figure 2:
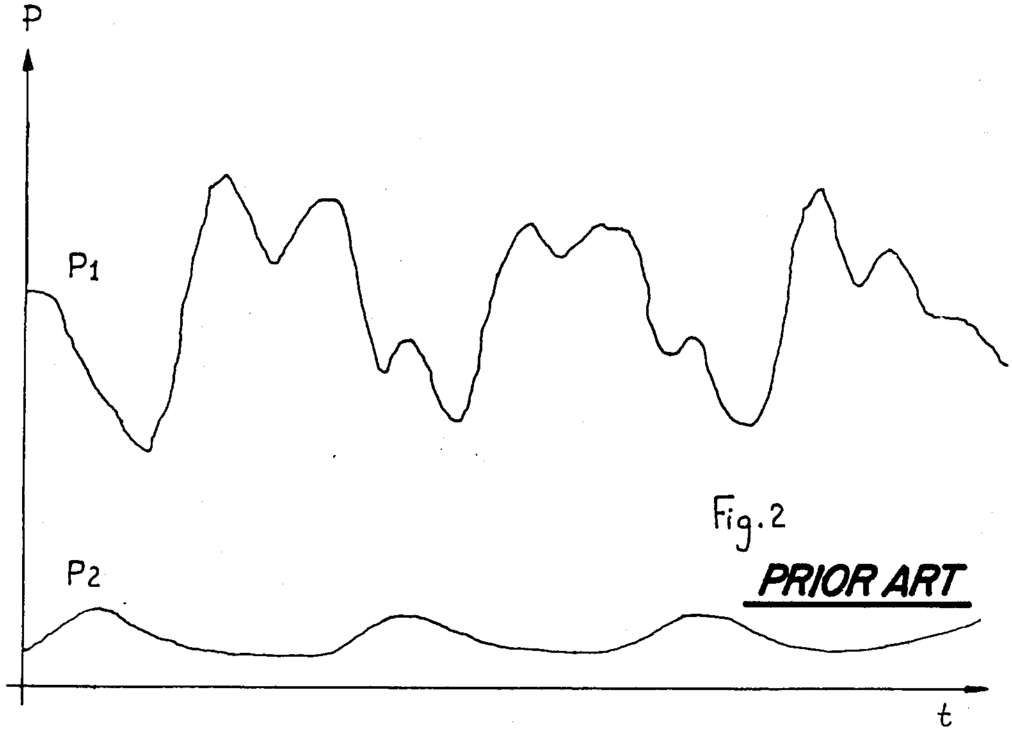
Fig. 2 PRIOR ART
FIG. 2 is a graph showing the relationship between pressure and time in the opposite chambers of a prior art hydraulic device if friction is taken into account.
Figure 6:
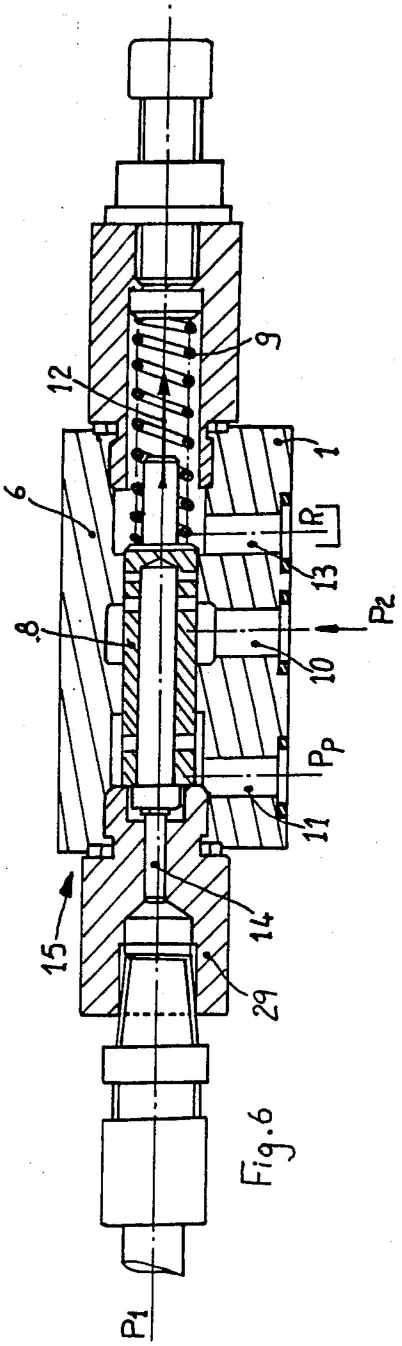
FIG. 6 shows a cross-sectional view of one embodiment of a pressure reducing valve operating as shown in FIG. 4.

The operation of the valve of the present invention is as follows:

As may be better understood with reference to FIG. 6, a hollow spool or slide 8 calibrated by a spring 9 slides in a body 6 of a valve 15. The valve 15 is supplied with pressure $P_2$ via an orifice 10. The slide 8, in its left-most position of rest against an annular stop, such as an end cap 29, connects the orifice 10 to an orifice 11 supplying a reduced pressure $P_p$. When this reduced pressure $P_p$ is sufficient to generate on the slide 8 a force greater than that of the spring 9, the slide 8 is displaced axially towards the right as indicated by the arrow 12 and at the same time compresses the spring 9. Displacement continues until the slide 8 closes the connection between the orifices 10 and 11, that is to say between $P_2$ and $P_p$. If it happens that $P_p$ continues to increase under the action of internal leaks within the valve or under the action of external leaks, the slide 8 is displaced further against the spring 9 and makes a connection with an orifice 13 where the pressure of the return tank prevails.

A pressure $P_1$ which comes from the loaded section or retaining chamber 4 of the jack 1 to be protected is applied to the piston 14 located at the left end of the slide 8. This pressure $P_1$ is added to that of the reduced pressure $P_p$ on the slide 8 of the valve, and the connection between the orifices 10 and 11 closes when the following relation is verified:

The total of the spring 9=the force attributed to $P_p$+the force attributed to $P_1$.

Figure 7:
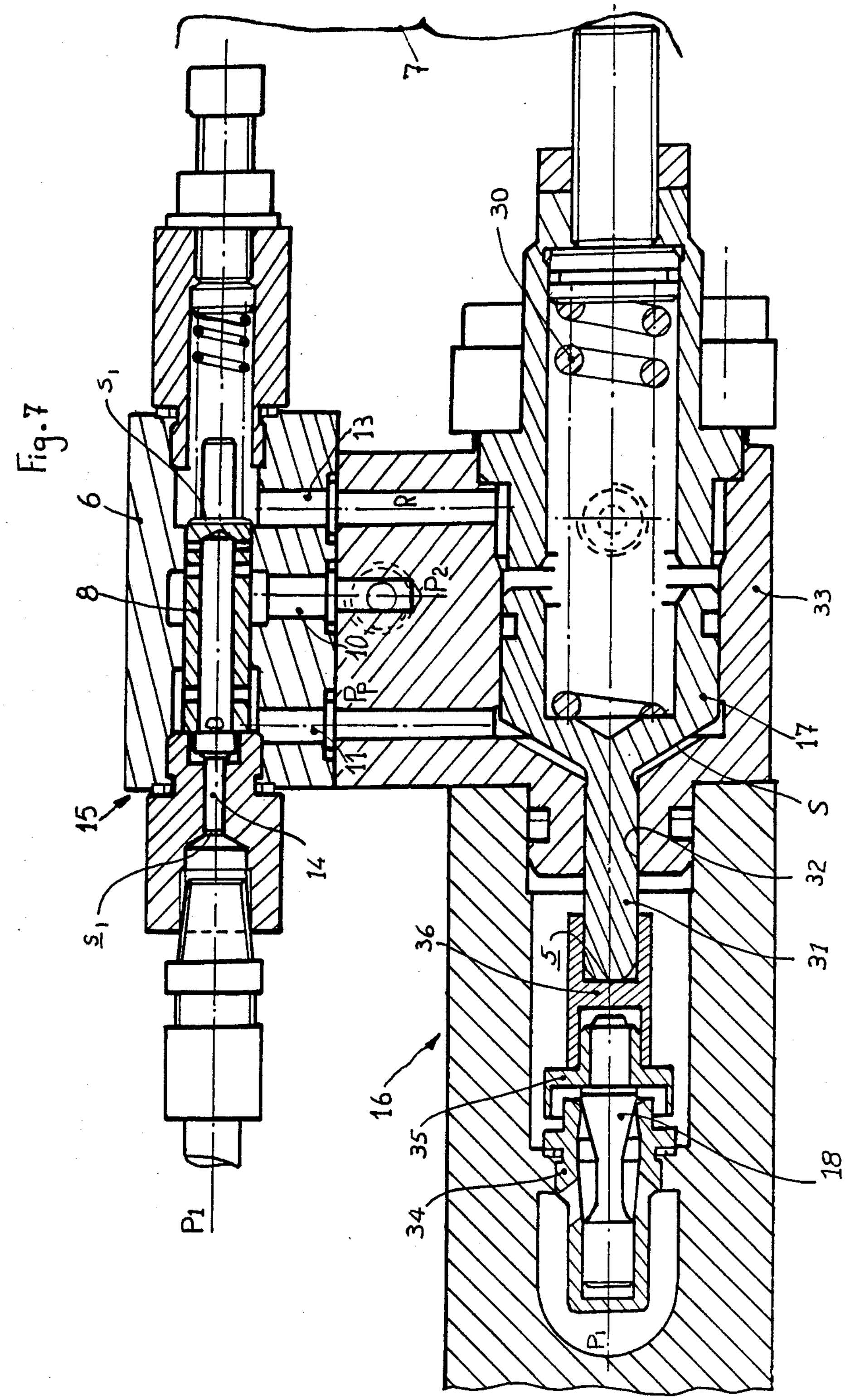
FIG. 7 shows the pressure-reducing valve of FIG. 6 mounted on the safety valve.

The valve 15, which has just been described, is a pressure reducing valve. It can be completed by assembling on it a safety valve 16, as illustrated in FIG. 7. The reduced pressure $P_p$ coming from the orifice 11 in the pressure-reducing valve 15 is applied to a pilot-control piston 17 of the safety valve 16. The pressure of the receiver $P_1$ (loaded section (4) is applied simultaneously to the piston 14 of the pressure-reducing valve 15 and to the flap member 18 of the safety valve 16.

To understand the principle of the control according to the invention, the equation of equilibrium of the safety valve 16 will be written out. If $P_0$ is the calibration pressure produced by the calibration spring 30, S denotes the area section where the pilot-control pressure $P_p$ is applied in the valve 16, $\underline{s}$ being the area section where the pressure to be braked $P_1$ is applied.

The following can be set out:

$$P_0 \cdot s = P_1 \cdot s + P_p \cdot S$$

$$P_p = (P_0 - P_1) \cdot \frac{s}{S}$$

With reference to FIG. 7, the area section S is equal to the cross-sectional area of the pilot-control piston 17 minus the cross-sectional area $\underline{s}$ of a control piston 31 which extends axially from the pilot-control piston 17. The control piston 31 passes through an aperture 32 provided at the piston housing 33. As described in U.S. Pat. No. 4,470,339, the aperture of the valve seat for the flap member 18 provided in the flap housing 34 has the same cross-sectional area $\underline{s}$ as the control piston 31. Because the flap member 18 is directly connected to the end of the control piston 31 by means of a cap 35 and a connecting sleeve 36, the pressure $P_1$ acting on the flap member 18 produces a force $P_1.\underline{s}$ acting on the end of the control piston 31 which is added to the force $P_p.S$ acting on the pilot control piston 17. The sum of these two forces are counterbalanced by the force F of the calibration spring. The calibration pressure $P_0$ produced by the calibration spring which urges the flap member 18 against its seat is F1s. Therefore, the calibration force $P_0\underline{s}$ is equal to $P_1\underline{s}+P_p.S$.

The pressure reducing valve 15 is arranged in such a way that the reduced pressure $P_p$ is applied to an area section $S_1$ which is equal to the cross-sectional area of the spool 8 and the pressure $P_1$ to be braked is applied to an area section $\underline{s_1}$ which is equal to the cross-sectional area of the piston 14. Because of the design the following is applicable:

$$\frac{s_1}{S_1} = \frac{s}{S}$$

Moreover, in the absence of a pressure to be braked, the reduced pressure is calibrated to the value $$P_{p0} = P_0 \times \frac{s}{S}$$

or $$P_{po} = P_o \times \frac{s_1}{S_1},$$

where $P_o\underline{s}_1 = P_1 s_1 + P_p S_1$. This being the condition of opening of the safety valve 16. $P_o$ is the calibration pressure of the pressure reducing valve 15 produced by the calibration spring 9 as shown in FIG. 6.

Thus, the equation of equilibrium of the safety valve 16 is written as follows:

$$P_{po} \times S_1 = P_p \times S_1 + P_1 \times s_1$$

or $$P_p o = P_p + P_1 \times \frac{s_1}{S_1}$$

If the calibration condition of the safety valve 16 is adopted as $$P_{po} = P_o \times \frac{s_1}{S_1},$$

the following applies:

$$P_o \times \frac{s_1}{S_1} = P_p + P_1 \times \frac{s_1}{S_1}$$

or alternatively:

$$P_o \times \frac{s}{S} = P_p + P_1 \times \frac{s}{S}$$

This is the equation of equilibrium of the pilot controlled braking valve 7 according to the invention. Thus, the pilot-control pressure is permanently adjusted to its proper value.

The pressure reducing valve 15 can be calibrated mechanically, such as by means of a spring, hydraulically, or electrically.

The opening of the flap member 18 of the safety valve 16 is calibrated to a pressure $P_{p0}$. This is defined in the following way:

$$P_{p0} = P_p + P_1 \frac{s_1}{S_1}, \text{ or } P_p = P_{p0} - P_1 \frac{s}{S}$$

If $P_{p0}$ is set below the theoretical value $$P_0 \frac{s}{S},$$

then $P_p$ will be lower. To obtain the opening of the safety valve, it will be necessary for $P_1$ to increase, thus causing $P_2$ to increase. This makes it more favorable for the safety valve to function as a pressure limiter.

$P_{p0}$ is set above the theoretical value, then $P_p$ increases. This favors the opening of the safety valve as a result of pilot-control and, therefore, its operation as a flow limiter.

Some safety valves are not balanced to the return pressure. This is true, for example, of the alternative form illustrated in FIG. 5. In this case, a flap or braking system 18 is subjected to closing forces and to opening forces corresponding to the following equation:

closing forces: $P_o \cdot s + P_r \cdot S$ opening forces: $P_1 \cdot s + P_p \cdot S$ where $P_r$ is the pressure of the return tank to which the orifice 13 is connected.

Consequently, when these forces are balanced, the following is true:

$$P_o \cdot s + P_r \cdot s = P_1 \cdot s + P_p \cdot S$$

$$P_o = (P_1 - P_r) + P_p \frac{S}{s}.$$

Figure 8:
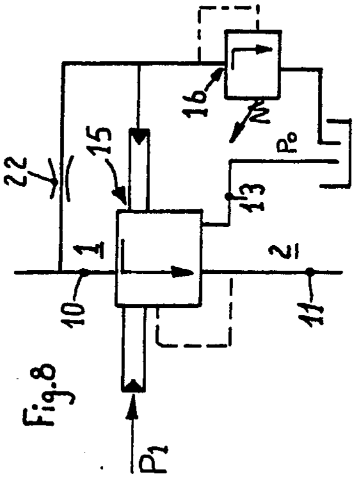
FIG. 8 shows a schematic hydraulic diagram of another alternative form of the invention.
Figure 9:
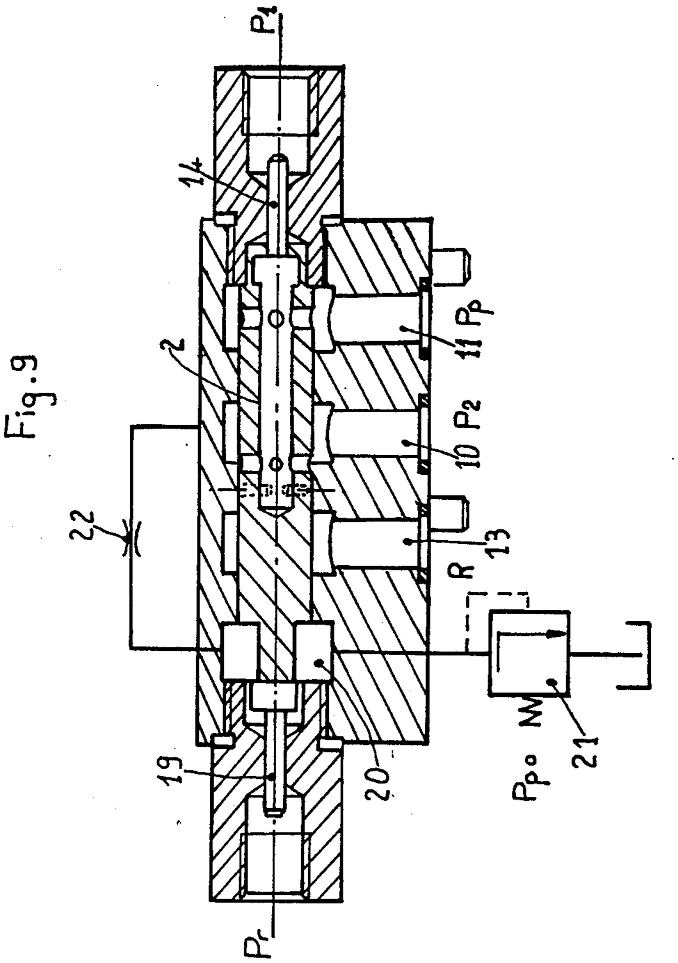
FIG. 9 is a partially hydraulic schematic view of an apparatus shown partially in cross-section, corresponding with the form of the invention shown in FIG. 8.

If there is added to the pressure reducing valve 15 or hydraulic balance a piston 19 of section $\underline{s}_1$ as shown in FIGS. 8 and 9, to which the return pressure $P_r$ is applied, thus generating a force which is added to the calibration force, the following will apply:

$$P_{po} \cdot S_1 + P_r \cdot \underline{s}_1 = P_1 \cdot s_1 + P_p \cdot S_1$$

$$P_{po} \times S_1 = (P_1 - P_r) s_1 + P_p \times S_1$$

with the calibration condition:

$$P_{po} = P_o \times \frac{s}{S} = P_o \times \frac{s_1}{S_1}$$

and the following is found again:

$$P_o \times \frac{s_1}{S_1} \times S_1 = (P_1 - P_r)\, s_1 + P_p \times S_1$$

$$P_o = (P_1 - P_r) + P_p \frac{S_1}{s_1}$$

The pilot-control pressure $P_p$ is correctly adjusted again.

In the exemplary embodiment given in FIGS. 8 and 9, the pressure reducing valve 15 described above with reference to FIG. 6 is calibrated hydraulically as a result of the action of a calibration pressure in a chamber 20. This pressure is defined by a pressure limiter 21 acting on the flow controlled by a flow restriction nozzle 22. The additional piston 19 of section $\underline{s}_1$ generates on the slide 8, under the action of $P_r$, a force which is added to that produced by the pilot-control pressure.

Other cases of operation may be envisaged. For example, when the pressure $P_2$ is to be a drive pressure, it is then necessary to control the safety valve 16 freely so that it opens to the maximum extent in order to limit the counterpressure on the normally braked section. It will be necessary to arrange on the pilot-control of the safety valve 16 a sequence which connects the pilot-control of the valve directly to the pressure $P_2$. Moreover, by careful design, this sequence can be integrated in the pressure reducing valve 15.

The arrangement to limit the pressure $P_2$ involves a calibrated sequence valve, over-calibration of the spring, and the application of a force which is a function of $P_2$ on the slide of the pressure-reducing valve.

Figure 10:
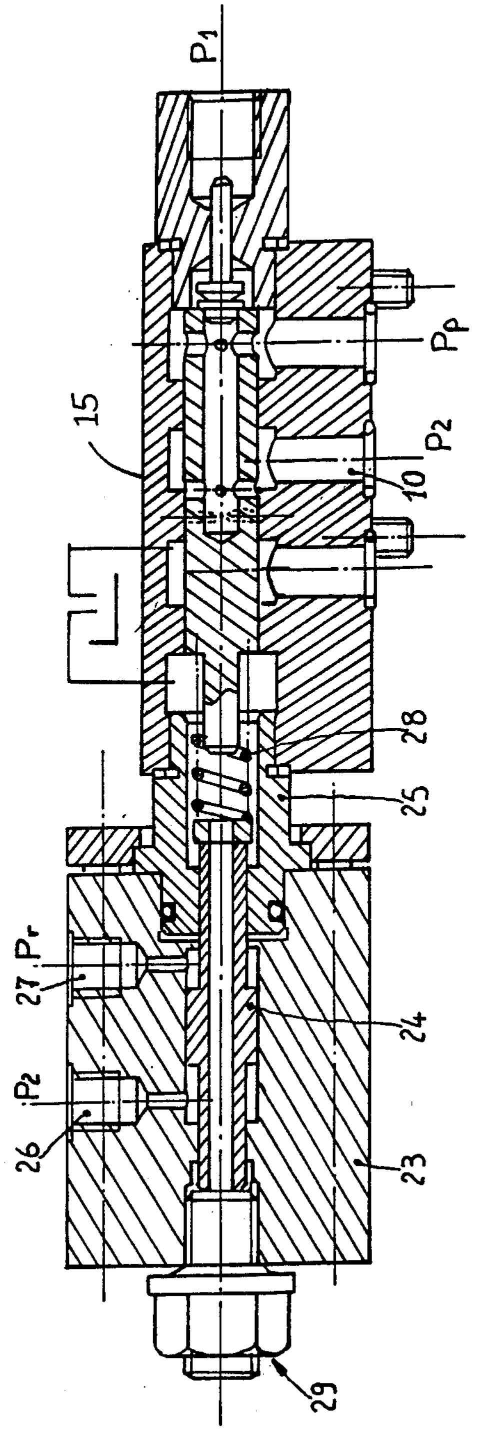
FIG. 10 shows another alternative form which corresponds to over-calibration.

An example of over-calibration is given in FIG. 10. There is added to the pressure reducing valve 15 an assembly including a body 23 in which a double-rod piston 24 slides. This piston defines, together with the bores in the body and a bearing 25, two chambers connected to orifices 26 and 27 which, respectively, receive the pressures $P_2$ and $P_r$.

The annular area sections of the chambers are equal, and their values are determined so as to ensure that the spring is over-calibrated as soon as the difference $P_2 - P_r = P$ is greater than the tension of the spring relative to the annular area section defined by the constructional dimensions.

The tension of a spring 28 is fixed by an adjusting screw 29.

In general terms, it will be seen that in all the alternative forms which have just been described, the hydraulic balance ensures at every moment equality between the pressure to be retained $P_1$ and the return pressure $P_r$. In other words, the pilot-control pressure is adjusted as a function of the pressure conditions encountered by the braking valve itself. Not only the retaining pressure $P_1$, but also the pilot-control pressure $P_p$, is balanced.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A braking valve for retaining a load pressure $P_1$ in a hydraulic circuit comprising:

a pilot-controlled valve for retaining the load pressure $P_1$ in said hydraulic circuit in response to a pilot-control pressure $P_p$; and a pressure reducing valve connected to said hydraulic circuit for providing said pilot-control pressure $P_p$ to said pilot-controlled valve, said pressure reducing valve having means responsive to the sum of said load pressure $P_1$ and said pilot-control pressure $P_p$ having a predetermined value for controlling the value of said pilot-control pressure $P_p$ as an inverse function of said load pressure $P_1$.

2. The braking valve according to claim 1, wherein said pilot-control pressure $P_p$ is determined by a biased pilot valve member responsive to a hydraulic balance which balances the sum of the forces produced by said load pressure $P_1$ to be retained and said pilot-control pressure $P_p$ to be equal to a calibration force biasing said pilot valve member in opposition to said load pressure $P_1$ and said pilot-control pressure $P_p$.

3. The braking valve according to claim 1, wherein said load pressure $P_1$ to be retained prevails in a first section of a double-acting jack.

4. The braking valve according to claim 3, wherein said pressure reducing valve decreases the value of a pressure $P_2$ prevailing in a second section opposite said first section of said double-acting jack to produce said pilot-control pressure $P_p$.

5. A pilot-controlled valve for controlling the load pressure in the load side of a load means, comprising:

pressure reducing valve means operatively coupled to said load means for producing a pilot pressure, said pressure reducing valve means having a pilot valve member biased to a first position by first means generating a pilot calibration force to generate said pilot pressure, said pilot valve member displaceable to a second position against the force of said pilot calibration force terminating the generation of said pilot pressure in response to a composite force which is the sum of a load force produced by said load pressure and a pilot force produced by said pilot pressure exceeding said pilot calibration force; and safety valve means coupled to said pressure reducing valve means and said load means for controlling the load pressure on the load side of said load means, said safety valve means having a pilot-controlled valve member biased to a first position by second means generating a safety calibration force maintaining said load pressure and being displaceable to a second position controlling said load pressure in response to a sum force acting on said pilot-controlled valve member, said sum force being the sum of a load force produced by said load pressure and a pilot force produced by said pilot pressure.

6. The pilot-controlled valve of claim 5, wherein said pilot valve member has a first area section responsive to said load pressure and a second area section responsive to said pilot pressure, said first and second area sections defining a pilot section ratio whose value is equal to said first area section divided by said second area section and said pilot valve member has a first safety valve area section responsive to said load pressure and a second safety valve area section responsive to said pilot pressure, said first and second safety valve area sections defining a safety section ratio whose value is equal to said first safety valve area section divided by said second safety valve area section.

7. The pilot-controlled valve of claim 6, wherein said pilot calibration force produces a pilot calibration pressure opposed to said load pressure applied to said first area section of said pilot valve member and said pilot pressure applied to said second area section of said pilot valve member so that said pilot pressure produced by said pressure reducing valve is equal to the product of said pilot section ratio times a pressure difference between said load pressure and said pilot calibration pressure.

8. The pilot-controlled valve of claim 6, wherein said pilot section ratio equals said safety valve section ratio.

9. The pilot-controlled valve of claim 7 wherein said pilot calibration force produces a pilot calibration pressure opposed to said load pressure applied to said first area section of said pilot valve member and said pilot pressure applied to said second area section of said pilot valve member so that said pilot pressure produced by said pressure reducing valve is equal to the product of said pilot section ratio times a pressure difference between said load pressure and said pilot calibration pressure.

10. The pilot-controlled valve of claim 9, wherein said safety calibration force produces a safety calibration pressure opposing said load pressure applied to said first area section of said pilot valve member, said safety calibration pressure is set below a product of said pilot calibration pressure and said safety valve section ratio, to cause said safety valve means to function as a pressure limiter.

11. The pilot-controlled valve of claim 9, wherein said safety calibration force produces a safety calibration pressure opposing said load pressure applied to said first area section of said pilot valve member, said safety calibration pressure is set above a product of said calibration pressure and said safety valve ratio, to cause said safety valve means to function as a flow limiter.

12. Pilot-controlled valve means adapted to control the load pressure at the load side of load means, said pilot-controlled valve means comprising:

pressure reducing valve means having a load orifice in communication with said load side of said load means, a source orifice in communication with a pressure source, and a pilot orifice adapted to provide a pilot pressure, said pressure reducing valve means further comprising a pilot valve member movable between an open and a closed position, said open position providing communication between said source orifice and said pilot orifice, and said closed position blocking communication between said source orifice and said pilot orifice, and pilot calibration means providing a pilot calibration force biasing said pilot valve member to said open position when a sum force equal to the sum of a pilot load force provided by said load pressure and a pilot force provided by said pilot pressure is less than said pilot calibration force, and said pilot valve member being moved to said closed position when said sum force is substantially equal to said pilot calibration force; and safety valve means having a load orifice in communication with said load side of said load means to provide a safety load force, a pilot orifice in communication with said pilot orifice of said pressure reducing valve means receiving said pilot pressure, a tank orifice in communication with a tank pressure and a safety valve member, said safety valve means further comprising safety calibration means providing a safety calibration force biasing said safety valve member to a close position, said safety valve member operative to connect said load orifice to said tank orifice to vary said load pressure in response to a safety load force produced by said load pressure and a pilot force produced by said pilot pressure exceeding said safety calibration force.

13. The pilot-controlled valve means of claim 12, wherein said safety calibration force produces a safety calibration pressure applied to said safety valve member opposing said safety load force, said safety valve member being controlled by said pilot force so as to maintain said load pressure in accordance with a difference between said safety calibration pressure and a function of said pilot pressure.

14. The pilot-controlled valve means of claim 13, wherein said load means has a second side opposite said load side, said second side of said load means is said pressure source in communication with said source orifice of said pressure reducing valve means, whereby said pilot pressure varies in accordance with a difference between said load pressure and said pressure source pressure.

* * * * *

UNITED STATES PATENT AND TRADEMARK OFFICE
CERTIFICATE OF CORRECTION

PATENT NO. : 4,854,221

DATED : August 8, 1989

INVENTOR(S) : Maurice Tardy

It is certified that error appears in the above-identified patent and that said Letters Patent is hereby corrected as shown below:

Column 4, line 6, after "total" insert ---- force ----.

Column 4, line 14, delete "(4)" and insert ---- 4) ----.

Column 4, line 27, the equation should read as follows ----

$P_0 \cdot \underline{s} = P_1 \cdot \underline{s} + P_p \cdot S$ ----.

Column 4, line 29, the equation should read as follows ----

$P_p = (P_0 - P_1) \cdot \frac{s}{S}$ ----.

Column 4, line 43, delete "$P_1 . \underline{s}$" and insert ---- $P_1 \cdot \underline{s}$ ----.

Column 4, line 44, delete "$P_p . S$" and insert ---- $P_p \cdot S$ ----.

Column 4, line 50, delete "$P_0\underline{s}$" and insert ---- $P_0 \cdot \underline{s}$ ----.

Column 4, line 50, delete "$P_1\underline{s} + P_p . S$" and insert ----

$P_1 \cdot \underline{s} + P_p \cdot S$ ----.

Column 4, line 60, the equation should read as follows ----

$\frac{s_1}{S_1} = \frac{s}{S}$ ----.

UNITED STATES PATENT AND TRADEMARK OFFICE
CERTIFICATE OF CORRECTION

PATENT NO. : 4,854,221

DATED : August 8, 1989

INVENTOR(S) : Maurice Tardy

It is certified that error appears in the above-identified patent and that said Letters Patent is hereby corrected as shown below:

Column 4, line 65, the equation should read as follows ----

$P_{p0} = P_0 \text{ X } \frac{s}{S}$ ---.

Column 5, line 1, the equation should read as follows ----

$P_{po} = P_o \text{ X } \frac{s_1}{S_1}$ ----.

Column 5, line 5, delete "$P_o\underline{s}_1 = P_1 s_1 + P_p S_1$" and insert

---- $P_o\underline{s}_1 = P_1\underline{s}_1 + P_p S_1$ ----.

Column 5, line 17, the equation should read as follows ----

$P_{po} = P_p + P_1 \text{ X } \frac{s_1}{S_1}$ ----.

Column 5, line 23, the equation should read as follows ----

$P_{po} = P_o \text{ X } \frac{s_1}{S_1}$ ----.

Column 5, line 28, the equation should read as follows ----

$P_0 \text{ X } \frac{s_1}{S_1} = P_p + P_1 \text{ X } \frac{s_1}{S_1}$ ----.

Column 5, line 34, the equation should read as follows ----

$P_o \text{ X } \frac{s}{S} = P_p + P_1 \text{ X } \frac{s}{S}$ ----.

Column 5, line 48, the equation should read as follows ----

$P_{p0} = P_p + P_1 \frac{s_1}{S_1}$, or $P_p = P_{p0} - P_1 \frac{s}{S}$ ----.

UNITED STATES PATENT AND TRADEMARK OFFICE
CERTIFICATE OF CORRECTION

PATENT NO. : 4,854,221

DATED : August 8, 1989

INVENTOR(S) : Maurice Tardy

It is certified that error appears in the above-identified patent and that said Letters Patent is hereby corrected as shown below:

Column 5, line 53, the equation should read as follows ----

$P_0 \frac{s}{S}$ ----.

Column 6, line 1, the equation should read as follows ----

$P_o \cdot \underline{s} + P_r \cdot \underline{s}$ ----.

Column 6, line 3, the equation should read as follows ----

$P_1 \cdot \underline{s} + P_p \cdot S$ ----.

Column 6, line 10, the equation should read as follows ----

$P_o \cdot \underline{s} + P_r \cdot \underline{s} = P_1 \cdot \underline{s} + P_p \cdot S$ ----.

Column 6, line 14, the equation should read as follows ----

$P_o = (P_1 - P_r) + P_p \frac{S}{\underline{s}}$ ----.

Column 6, line 22, the equation should read as follows ----

$P_{po} \cdot S_1 + P_r \underline{s}_1 = P_1 \cdot \underline{s}_1 + P_p \cdot S_1$ ----.

Column 6, line 24, the equation should read as follows ----

$P_{po} \times S_1 = (P_1 - P_r)\underline{s}_1 + P_p \times S_1$ ----.

Column 6, line 29, the equation should read as follows ----

$P_{po} = P_o \times \frac{s}{S} = P_o \times \frac{s_1}{S_1}$ ----.

UNITED STATES PATENT AND TRADEMARK OFFICE
CERTIFICATE OF CORRECTION

PATENT NO. : 4,854,221 Page 4 of 4

DATED : August 8, 1989

INVENTOR(S) : Maurice Tardy

It is certified that error appears in the above-identified patent and that said Letters Patent is hereby corrected as shown below:

Column 6, line 34, the equation should read as follows ----

$$P_o \text{ X } \frac{\underline{s}_1}{S_1} \text{ X } S_1 = (P_1 - P_r)\, \underline{s}_1 + P_p \text{ X } S_1$$ ----.

Column 6, line 37, the equation should read as follows ----

$$P_o = (P_1 - P_r) + P_p \frac{S_1}{\underline{s}_1}$$ ----.

Column 8, line 28, after "safety" insert ---- valve ----.

Column 8, line 66, after "said" insert ---- pilot ----.

Column 5, line 11, the equation should read as follows ----

$$P_{po} \text{ X } S_1 = P_p \text{ X } S_1 + P_1 \text{ X } \underline{s}_1$$ ----.

Column 5, line 60, before "$P_{p0}$" insert ---- If ----.

Signed and Sealed this

Fourth Day of June, 1991

*Attest:*

HARRY F. MANBECK, JR.

*Attesting Officer* *Commissioner of Patents and Trademarks*